United States Patent Office 3,442,493
Patented May 6, 1969

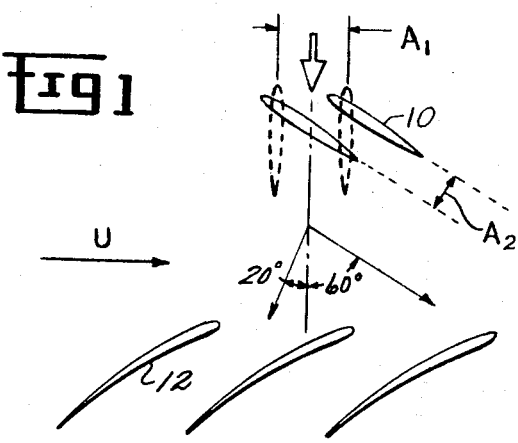
Fig 1
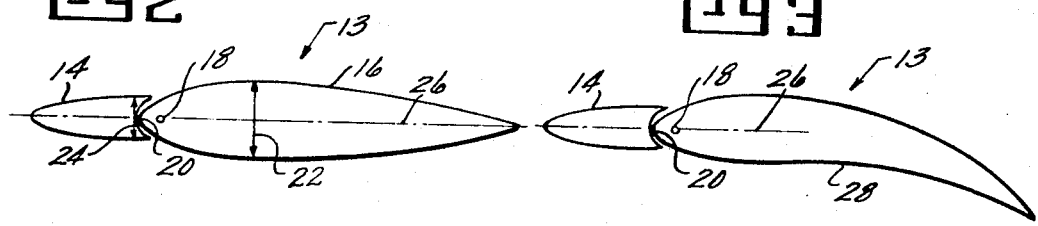
Fig 2
Fig 3
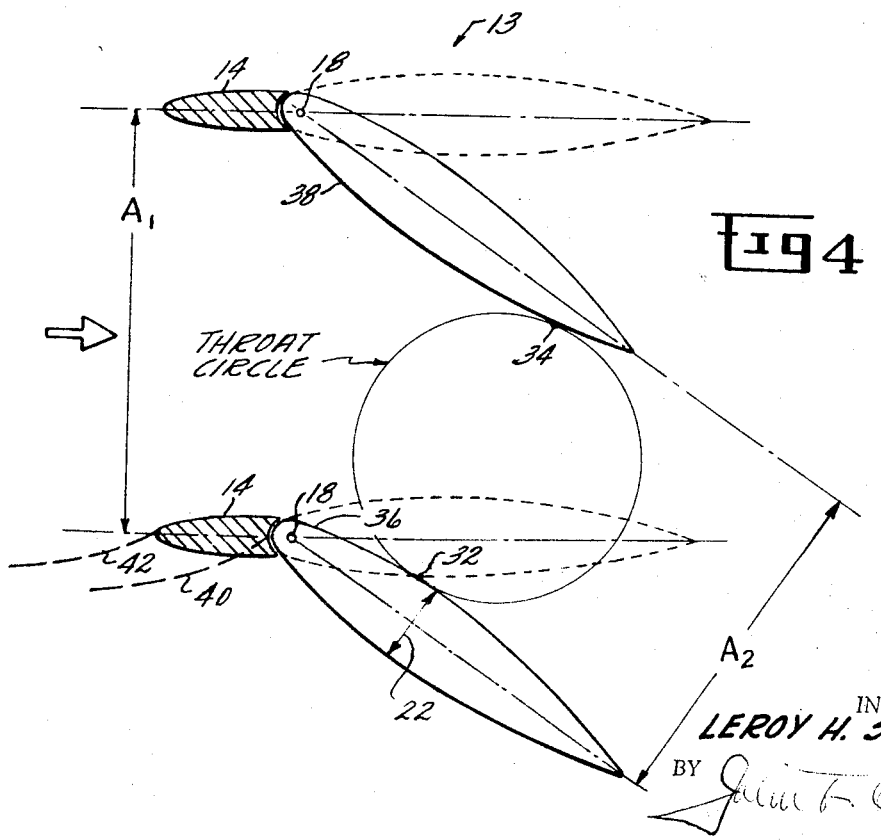
Fig 4
INVENTOR.
LEROY H. SMITH, JR.
BY
ATTORNEY—

3,442,493
ARTICULATED AIRFOIL VANES
Leroy H. Smith, Jr., Cincinnati, Ohio, assignor to General Electric Company, a corporation of New York
Filed Oct. 22, 1965, Ser. No. 501,275
Int. Cl. F01d 9/02; B64c 29/00; F04d 29/40
U.S. Cl. 253—78                                            1 Claim

ABSTRACT OF THE DISCLOSURE

A cascade of articulated vanes selectively directs air flow through a given turn angle. Each vane comprises a fixed upstream portion directed into the direction of air flow and a pivoted portion immediately adjacent the downstream edge of the fixed portion. The adjacent portions are contiguous and smoothly curved for movement of the pivoted portion through a substantial angle. The pivoted portion has a thickness at its upstream end approximating the adjacent thickness of the fixed portion and has a maximum thickness at a point substantially downstream of the pivot. The pivoted portion is smoothly curved from its upstream end to its point of maximum thickness and then is blended to a relatively thin trailing edge. The pivoted portion is also longer than the fixed portion and extends to the point of maximum thickness of the adjacent pivoted portion whereby air is turned through a given angle with a minimum of losses as a result of being continuously accelerated as it is turned.

---

The present invention provides an articulated airfoil vane and, more particularly, a two-piece articulated vane that may be used for wide turning angles as an inlet guide vane for aircraft compressors.

In many applications, such as inlet guide vanes for aircraft engine compressors, it is necessary that the compressors operate efficiently over a very broad range. The guide vanes in such compressors may have to meet the requirement of working efficiently through a turning angle range of as high as 80°. This is very difficult to achieve and the best turning vanes generally operate efficiently over a range of about 45°, or roughly half the range desired. Additionally, the vanes may be required to direct the airflow both into and against the direction of rotor rotation. For example, an engine may require the vanes to turn the airflow about 20° against the direction of rotation at the design point and the vanes must close down to 0 (no turning) at about 80% speed and actually turn the flow as much as 60° in the direction of rotation for very low speed operating points. This means the guide vanes must work efficiently over a turning range of 80° as noted above. In order to maintain the vanes as simple as possible, single, one-piece cambered vanes are generally used and inefficient performance is accepted in a zone over part of the operating range. Unfortunately, it turns out that this zone may take up a large or critical portion of the operating range. It is known that, with a high solidity of vanes and as the vanes are turned and the exit area is reduced, there is a tendency of the flow to separate after 20° of turning because of the high angle of attack. The flow will then reattach after separation on further turing because of the large pressure drop across the vanes in the near-closed position. However, before this reattachment occurs there is a zone of separation in which a large amount of inefficient operation takes place. It is desired, of course, to have the air smoothly follow the guide vane in all positions of operation. It is possible to do this with variable camber vanes but such vanes introduce mechanical complexities and are more costly.

The main object of the present invention is to provide a specific two-part articulated vane that may be used in a cascade.

A further object is to provide such a vane which is so formed in structure as to prevent any substantial separated flow.

Another object is to provide a combination two-part articulated vane that provides efficient turning over greater ranges than obtainable in similar structures.

A further object is to provide such a vane which, used in a cascade of similar vanes, is designed to provide a contraction of the flow passage after the pivot point of its articulated portion by the thickness of the movable trailing portion.

Another object is to provide a vane that is so contoured that, in operation with similar vanes, there is a contoured fluid passage to prevent the occurrence of separated flow.

Briefly stated, the invention is a two-part articulated airfoil vane that is designed for use in a cascade of like vanes for directing the fluid flow. Each vane is made up of an uncambered fixed upstream portion that is substantially parallel to and directed into the flow. The second part of the articulated airfoil comprises a movable trailing portion that is pivoted at the downstream end of the fixed portion to rotate with respect to the fixed portion and generally in close proximity thereto. The trailing portion may preferably be uncambered or have a slight camber thereto for particular applications. The trailing portion is longer than the fixed portion and the maximum thickness of the trailing portion is greater than the maximum thickness of the fixed portion to create a favorable pressure gradient that prevents flow separation. Additionally, the longer trailing portion is designed to prevent, with the fixed portion, a smooth substantially continuous flow surface when the trailing portion is in its fully deflected position. In a cascade of similar vanes the trailing portion, when deflected, must extend beyond the pivot of the adjacent vane.

While the specification concludes with claims particularly pointing out and distinctly claiming the subject matter which is regarded as the invention it is believed the invention will be better understood from the following description taken in connection with the accompanying drawings, in which:

FIGURE 1 is a partial diagrammatic sketch of a typical compressor application;

FIGURE 2 is a cross-sectional view of the two-part articulated airfoil vane of the present invention;

FIGURE 3 is similar to FIGURE 2 showing a modification; and

FIGURE 4 is a diagrammatic illustration of the vanes as they occur in a cascade illustrating the closed and open position.

It should be understood that the two-part articulated airfoil vane to be described is applicable for cascades wherever it is desired to efficiently turn a fluid flow over a large range. The vanes may be used to vector thrust from a VTOL aircraft; they may be used as inlet louvers; they may be used in axial, radial, or mixed flow compressors as well as turbines, pumps and fans to turn the inlet fluid over a large operating range with significant loss reduction. The use of a particular vane as applied to a compressor will generally be described for convenience of illustration.

Referring first to FIGURE 1, there is shown a diagrammatic illustration of a compressor application which employs inlet guide vanes 10 that are spaced apart as shown to provide an inlet area $A_1$ therebetween. Two guide vanes are shown as part of a cascade of such vanes generally employed as inlet guide vanes. The incoming airflow, shown by the large arrow passes through these vanes into rotor vanes 12. The guide vanes are designed to turn the flow into rotor vanes 12 over a wide range of operation as shown by the small arrows that may range from 20° against the direction of rotation U, at the design point, to a closed down to zero or straight through position (as shown dotted) at about 80% speed and then the vanes may actually further turn in the opposite direction as shown solid as much as 60° in the direction of rotation for very low speed operation. It will be apparent that turning vanes 10 in any direction reduces the area between the vanes from $A_1$ to $A_2$ as shown.

When vanes 10 are turned over large areas, they are set at a very high angle of attack to the incoming air shown by the large arrow with the result that the air cannot negotiate the large abrupt turn and flow separation occurs. The present invention is designed to avoid the separation over much larger angles up to 80° as shown in FIGURE 1.

It is well known that when a pressure drop occurs through nozzle vanes or guide vanes, the boundary layer tends to remain attached to the surface. The present invention is designed to ensure that this attachment will occur by providing a particular vane that will permit contraction of the flow passage to form a converging nozzle between certain vanes. Such a nozzle increases the velocity of flow and results in a lower pressure, hence the prevention of separation. To do this each vane is so formed that the passage between adjacent vanes has a favorable contour to provide for the non-separation while at the same time avoiding the high angle of attack which tends to cause separation in the first place.

Articulated vanes, as such, are well known and are used as a means of varying the camber of the vane. However, the instant vane, as seen in FIGURE 2, is an improvement on any such vanes known. Referring to FIGURE 2 the individual articulated airfoil vane generally indicated at 13, may be made in two parts comprising an uncambered fixed upstream portion 14 which is substantially parallel to and directed into the flow as are solid line vanes 10 in FIGURE 1. This portion is fixed so that it presents a substantially constant angle of attack to the incoming air. In order to obtain the wide turning range required as shown dotted in FIGURE 1, there is provided a single movable trailing portion 16 at the downstream end of the fixed portion. Trailing portion 16 is designed to rotate about a pivot or hinge 18 in either direction and the two airfoil portions preferably are in substantial contact at 20 to reduce as much as possible any slot between the two portions. In order to provide the favorable contour passage between vanes, it is important that the trailing portion have a certain form. These are that portion 16 must be longer than the fixed portion as shown in FIGURE 2. Also the maximum thickness 22 of the trailing portion must be greater than the maximum thickness 24 of the fixed portion. Additionally, the trailing portion must be shaped so that, in its deflected position, it forms with the fixed portion a substantially continuous smooth flow surface, i.e.—no steps or sharp discontinuities, along the convex side of the deflected articulated vane. While the movable trailing portion 16 is shown as uncambered in FIGURE 2 for a wide range of operation about a symmetrical centerline 26, some applications may require fluid direction generally in one or the other direction away from centerline 26. In such applications, a slight camber may be desirable as shown in the partial movable portion 28 in FIGURE 3. It is essential that the length, maximum thickness and shape limitations be met by this modification also.

In order that the flow passages between the adjacent airfoil vanes may be so contoured so as to maintain the desired attachment of the fluid flow over a wide range, the individual airfoils are disposed in a cascade as shown in FIGURE 4. This figure illustrates the open position of the vanes 13 of the invention in dotted lines and the fully closed position in solid lines. The same areas $A_1$ and $A_2$ are those that are shown in FIGURE 1. As previously stated, it is well known that a velocity increase is synonymous with a pressure decrease and that boundary layer air tends to remain attached and thus the flow remains attached in such an environment. In order to ensure this opeartion at all conditions over a wide range, the solid line fully closed position shown in FIGURE 4 employs the vanes of FIGURE 2. These vanes are proportioned as described and disposed so that, when cascaded and closed as shown, the trailing portion of the top vane in FIGURE 4 must extend beyond the pivot point 18 of the adjacent or lower vane. Preferably, it is desired to extend it at least as far back as the maximum thickness 22 as shown but it may go farther. This then, forms a longer converging nozzle from the pivot point 18 to the throat circle shown that passes through points 32 and 34 on the respective vanes close to the maximum thickness portion. When the trailing edge extends slightly beyond the maximum thickness 22, the nozzle throat occurs upstream of the maximum thickness as shown. This converging nozzle results in higher velocity airflow, and pressure reduction with the tendency of the flow to remain attached. It will be apparent that any separation in FIGURE 4 will occur on the suction surface 36 around the hinge point of the lower vane. The air will follow the pressure surface 38 of the adjacent upper airfoil since there is no tendency to separate. By providing the converging nozzle from the pivot point 18 through the range from 18 to the throat circle at 32 separation will be avoided in this region also.

Additionally, with the fixed forward portion 14 of the articulated vanes there is a tendency to reduce the angle of attack. In other words, the normal streamline 40 has its curvature approaching the pivot 18 of the airfoil reduced to assume a new position 42 reducing the angle of flow with respect to the leading edge of the airfoil making it easier for the flow to negotiate the turn at the hinge point and into the inclined direction of the hinged airfoil. The small fixed portion 14, being less than the movable portion in length, actually carries lift on it which tends to turn the flow into the direction in which the hinged portion 16 has been moved.

Thus, the present airfoil, when disposed in a cascade, has a novel structure to maintain attachment of the airflow over a very wide range or turning angle. The provision of the maximum thickness of the movable portion being greater than the maximum thickness of the fixed portion and the smooth flow surface between provides for the desirable converging nozzle and consequent pressure condition to ensure that this attachment or non-separation occurs over the workable range.

If more turning is desired in one direction of the centerline rather than symmetrical operation, then the trailing portion may be slightly cambered into the direction of turn as previously explained.

I claim:

1. A cascade of airfoil vanes for selectively directing fluid flow, each vane comprising, a fixed upstream portion directed into the direction of air flow, a pivoted portion immediately adjacent the downstream edge of said fixed portion, the adjacent portions thereof being contiguous and smoothly curved for pivotal movement of the pivoted portion through a substantial angle, said pivoted portion having a thickness, at said pivot, approximating the adjacent thickness of the fixed portion and a maximum thickness at a point substantially downstream of said pivot and said pivoted portion being smoothly curved from its upstream edge to said point of maximum thickness and then blended to a relatively thin trailing edge, said pivoted portion being longer than its fixed portion and extending at least to the point of maximum thickness of an adjacent pivoted portion when both are in a similarly pivoted position, whereby air may be selectively directed through a substantial turning angle with a minimum of losses.

References Cited

UNITED STATES PATENTS 3,059,902  10/1962  Savonuzzi _____ 253—78

3,066,488  12/1962  Mock _____ 253—78

SAMUEL FEINBERG, *Primary Examiner.*

U.S. Cl. X.R.

230—114